US008866815B2

(12) United States Patent
Helfman et al.

(10) Patent No.: US 8,866,815 B2
(45) Date of Patent: Oct. 21, 2014

(54) AUTOMATED TREEMAP CONFIGURATION

(75) Inventors: Jonathan Helfman, Half Moon Bay, CA (US); Joseph Goldberg, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 851 days.

(21) Appl. No.: 11/752,915

(22) Filed: May 23, 2007

(65) Prior Publication Data

US 2008/0295038 A1 Nov. 27, 2008

(51) Int. Cl.
G06T 11/20 (2006.01)
(52) U.S. Cl.
CPC .................................... *G06T 11/206* (2013.01)
USPC ......................................................... 345/440
(58) Field of Classification Search
USPC .......................................... 345/440; 715/853
See application file for complete search history.

(56) References Cited

U.S. PATENT DOCUMENTS

| 5,555,354 | A | 9/1996 | Strasnick et al. |
| 6,108,006 | A | 8/2000 | Hoppe |
| 6,349,315 | B1 * | 2/2002 | Sonoyama et al. ........... 715/209 |
| 6,429,868 | B1 | 8/2002 | Dehner et al. |
| 6,496,832 | B2 * | 12/2002 | Chi et al. ............................... 1/1 |
| 6,581,068 | B1 | 6/2003 | Bensoussan et al. |
| 6,583,794 | B1 * | 6/2003 | Wattenberg .................... 715/708 |
| 6,628,312 | B1 | 9/2003 | Rao et al. |
| 6,646,652 | B2 | 11/2003 | Card et al. |
| 6,724,403 | B1 * | 4/2004 | Santoro et al. ................ 715/765 |
| 6,812,941 | B1 | 11/2004 | Brown et al. |
| 6,928,436 | B2 * | 8/2005 | Baudel .................................. 1/1 |
| 6,941,513 | B2 | 9/2005 | Meystel et al. |
| 7,027,052 | B1 * | 4/2006 | Thorn et al. ................... 345/440 |
| 7,076,742 | B1 * | 7/2006 | Thorn et al. ................... 715/853 |
| 7,250,944 | B2 | 7/2007 | Anderson et al. |
| 7,287,234 | B2 * | 10/2007 | Leah et al. ..................... 715/853 |
| 7,336,279 | B1 | 2/2008 | Takiguchi |
| 7,346,858 | B1 * | 3/2008 | Berg et al. ...................... 715/853 |
| 7,378,969 | B2 | 5/2008 | Chan et al. |
| 7,427,987 | B2 * | 9/2008 | Uthe ............................... 345/440 |
| 7,429,987 | B2 * | 9/2008 | Leah et al. ..................... 345/440 |
| 7,447,999 | B1 | 11/2008 | Robertson et al. |

(Continued)

FOREIGN PATENT DOCUMENTS

JP 2005-011043 A 1/2005

OTHER PUBLICATIONS

University of Maryland, Treemap 4.1.1, Feb. 17, 2004, pp. 1-7.*

(Continued)

*Primary Examiner* — M Good Johnson
(74) *Attorney, Agent, or Firm* — Kilpatrick Townsend and Stockton LLP

(57) ABSTRACT

Systems and methods in accordance with various embodiments of the present invention provide for representing a plurality of source data values as graphical elements in a default treemap visualization, where each data value is associated with a plurality of data dimensions. A first data dimension is selected to be mapped to an area cell characteristic based on the first data dimension having a quality of numeric and a quality of non-negative. A second data dimension is selected to be mapped to a color cell characteristic based on the second data dimension having a quality of numeric and a quality of previously unmapped. The default treemap visualization is generated based on the selected first data dimension and the selected second data dimension.

20 Claims, 17 Drawing Sheets

(56) References Cited

U.S. PATENT DOCUMENTS

| | | | |
|---|---|---|---|
| 7,506,274 B2* | 3/2009 | Zhang et al. | 715/854 |
| 7,509,591 B1* | 3/2009 | Thorn et al. | 715/853 |
| 7,650,570 B2 | 1/2010 | Torrens et al. | |
| 7,689,570 B2 | 3/2010 | Fuchs | |
| 7,707,517 B2* | 4/2010 | Bier et al. | 715/835 |
| 8,139,063 B2 | 3/2012 | Helfman et al. | |
| 8,281,282 B2* | 10/2012 | Smith | 717/108 |
| 8,286,100 B2 | 10/2012 | Helfman et al. | |
| 2001/0007139 A1 | 7/2001 | Murray | |
| 2002/0046009 A1 | 4/2002 | Devaquet et al. | |
| 2002/0143864 A1 | 10/2002 | Page et al. | |
| 2002/0169730 A1 | 11/2002 | Lazaridis | |
| 2002/0169793 A1 | 11/2002 | Sweeney | |
| 2003/0030634 A1 | 2/2003 | Sang'udi et al. | |
| 2003/0052838 A1 | 3/2003 | Kim et al. | |
| 2003/0158846 A1* | 8/2003 | Ikehata et al. | 707/7 |
| 2003/0182177 A1 | 9/2003 | Gallagher et al. | |
| 2003/0214538 A1 | 11/2003 | Farrington et al. | |
| 2003/0237057 A1 | 12/2003 | Riedl et al. | |
| 2004/0046787 A1 | 3/2004 | Henry et al. | |
| 2004/0076139 A1 | 4/2004 | Kang-Yeh et al. | |
| 2004/0107277 A1 | 6/2004 | Levesque et al. | |
| 2004/0168115 A1 | 8/2004 | Bauemschmidt et al. | |
| 2004/0181554 A1 | 9/2004 | Heckerman et al. | |
| 2004/0183800 A1 | 9/2004 | Peterson | |
| 2004/0205535 A1* | 10/2004 | Newman et al. | 715/509 |
| 2004/0205536 A1* | 10/2004 | Newman et al. | 715/509 |
| 2004/0212615 A1* | 10/2004 | Uthe | 345/440 |
| 2004/0225962 A1 | 11/2004 | Ohashi et al. | |
| 2004/0236549 A1 | 11/2004 | Dalton | |
| 2004/0263513 A1* | 12/2004 | Smith et al. | 345/440 |
| 2004/0264513 A1* | 12/2004 | Shima et al. | 372/6 |
| 2005/0114786 A1 | 5/2005 | Decombe | |
| 2005/0149269 A1 | 7/2005 | Thomas et al. | |
| 2005/0160004 A1 | 7/2005 | Moss et al. | |
| 2005/0192930 A1 | 9/2005 | Hightower et al. | |
| 2006/0037019 A1 | 2/2006 | Austin et al. | |
| 2006/0082592 A1* | 4/2006 | Black-Ziegelbein et al. | 345/605 |
| 2006/0109949 A1 | 5/2006 | Tkaczyk et al. | |
| 2006/0235838 A1 | 10/2006 | Shan et al. | |
| 2006/0242169 A1 | 10/2006 | Tunning | |
| 2006/0248468 A1 | 11/2006 | Constantine et al. | |
| 2007/0011146 A1 | 1/2007 | Holbrook | |
| 2007/0203902 A1 | 8/2007 | Bauerle et al. | |
| 2007/0217689 A1 | 9/2007 | Yang et al. | |
| 2007/0226640 A1 | 9/2007 | Holbrook et al. | |
| 2007/0276228 A1 | 11/2007 | Vining et al. | |
| 2008/0010304 A1 | 1/2008 | Vempala et al. | |
| 2008/0027980 A1 | 1/2008 | Owens et al. | |
| 2008/0027981 A1 | 1/2008 | Wahl | |
| 2008/0046462 A1 | 2/2008 | Kaufman et al. | |
| 2008/0059911 A1 | 3/2008 | Kulo et al. | |
| 2008/0088628 A1 | 4/2008 | Lu et al. | |
| 2008/0216169 A1 | 9/2008 | Naizhen et al. | |
| 2008/0222129 A1 | 9/2008 | Komatsu et al. | |
| 2008/0231633 A1 | 9/2008 | Keller et al. | |
| 2008/0278496 A1 | 11/2008 | Helfman et al. | |
| 2009/0012991 A1 | 1/2009 | Johnson et al. | |
| 2009/0013270 A1 | 1/2009 | Helfman et al. | |
| 2009/0013271 A1 | 1/2009 | Helfman et al. | |
| 2009/0013281 A1 | 1/2009 | Helfman et al. | |
| 2009/0013287 A1 | 1/2009 | Helfman et al. | |
| 2009/0172603 A1 | 7/2009 | Young Suk Lee | |
| 2010/0214120 A1 | 8/2010 | Means et al. | |
| 2010/0280877 A1 | 11/2010 | Shelton et al. | |
| 2010/0287146 A1 | 11/2010 | Skelton et al. | |
| 2011/0016432 A1 | 1/2011 | Helfman | |

OTHER PUBLICATIONS

Wayback machine internet archive date of prior art cited, Feb. 14, 2007.*

Shneiderman, B., "Tree Visualization with Tree-Maps: A 2-D Space Filling Approach," *ACM Transactions on Graphics*, (Jun. 18, 1991), downloaded from the Internet: <<http://hcil.cs.umd.edu/trs/91-03/91-03.html>> 8 pages.

Singh et al., "Enterprise Reporting with Oracle Reports: Reliable, Extensible, and Integrated," An Oracle White Paper, (Aug. 5, 2005), Oracle Fusion Middleware, downloaded from the Internet: <<http://www.oracle.com/technology/products/reports/index.html>>, 16 pages total.

smartmoney.com , <<webpage>>"Map of the Marker", downloaded from the Internet: <<http://www.smartmoney.com/marketmap/popupfresh.cfm>>.

The Hive Group, "Manufacturing Quality Management," downloaded from the Internet: <<www.hivegroup.com/demos/product_mgmnt/product_failure_readlink.html>>.

The Hive Group, "Honeycomb: The Application for Turning Enterprise Data into Actionable Information," downloaded from the Internet: <<http://hivegroup.com/products.html>>.

"IE Boxing." Internet Archive: Wayback Machine. Feb. 6, 2006. Web. May 20, 2010. <http://web.archive.org/web/20060206032530/http://webhost.bridgew.edu/etribou/layouts/exp/ieboxes.html>.

Office Action mailed on Sep. 17, 2010, in related U.S. Appl. No. 11/773,880.

Office Action mailed on Nov. 23, 2010, in related U.S. Appl. No. 11/773,916.

Office Action mailed on Sep. 17, 2010, in related U.S. Appl. No. 11/773,895.

Office Action mailed on Sep. 17, 2010, in related U.S. Appl. No. 11/773,908.

Smartmoney.com, <<webpage>> "Map of the Market", downloaded from the Internet: <http://www.smartmoney.com/marketmap/popupfresh.cfm>>.

"Honeycomb: The Application for Turning Enterprise Data into Actionable Information," The Hive Group Business at a Glance, copyright 2000-2007, at URL: http://hivegroup.com/products.html, 3 pages.

Singh et al., "Enterprise Reporting with Oracle Reports: Reliable, Extensible, and Integrated," Oracle Fusion Middleware, Oracle Reports Whitepaper, Aug. 2005, 16 pages.

Shneiderman, "Tree Visualization with Tree-Maps: A 2-D Space Filling Approach," ACM Transactions on Graphics, Jun. 18, 1991, printed on May 18, 2007, at URL: http://hcil.cs.umd.edu/trs/91-03/91-03.html, 8 pages.

Shneiderman, "Treemaps for space-constrained visualization of hierarchies", Dec. 26, 1998, at URL: http://www.cs.umd.edu/hcil/treemap-history/, 12 pages.

Kolatch, et al., "CatTrees: Dynamic Visualization of Categorical Data Using Treemaps", May 2001, at URL: http://www.cs.umd.edu/class/spring2001/cmsc838b/Project/Kolatch_Weinstein/index.html, 12 pages.

Non-Final Office Action for U.S. Appl. No. 11/745,280 mailed on May 24, 2010; 11 pages.

Final Office Action for U.S. Appl. No. 11/745,280 mailed on Nov. 10, 2010; 12 pages.

Final Office Action for U.S. Appl. No. 11/773,880 mailed on Mar. 10, 2011; 9 pages.

Final Office Action for U.S. Appl. No. 11/773,895 mailed on Mar. 16, 2011; 10 pages.

Final Office Action for U.S. Appl. No. 11/773,908 mailed on Mar. 16, 2011; 8 pages.

Non-Final Office Action for U.S. Appl. No. 11/773,916 mailed on Jun. 8, 2010; 8 pages.

Office Action mailed on Jan. 5, 2012 in related U.S. Appl. No. 11/773,895.

Office Action mailed on Dec. 22, 2011 in related U.S. Appl. No. 11/773,916.

Andrienko et al., "Interactive maps for visual data exploration," 1999, http://geoanalytics.net/and/papers/ijgis99.pdf, 20 pages.

U.S. Appl. No. 11/745,280, Notice of Allowance mailed on Nov. 17, 2011 13 pages.

U.S. Appl. No. 11/773,880, Non Final Office Action mailed on Mar. 26, 2013, 10 pages.

U.S. Appl. No. 11/773,895, Non Final Office action mailed on Mar. 28, 2013, 12 pages.

(56) References Cited

OTHER PUBLICATIONS

U.S. Appl. No. 11/773,895, Office Action mailed on Mar. 17, 2012, 11 pages.
U.S. Appl. No. 11/773,908, Notice of Allowance mailed on Feb. 10, 2012, 14 pages.
U.S. Appl. No. 11/773,908, Notice of Allowance mailed on Jun. 11, 2012, 9 pages.
U.S. Appl. No. 11/773,916, Office Action mailed on Oct. 15, 2012, 10 pages.
U.S. Appl. No. 12/503,404, Final Office Action mailed on Mar. 29, 2013, 21 pages.
U.S. Appl. No. 12/503,404, Final Office Action mailed on Jul. 19, 2013, 21 pages.
U.S. Appl. No. 12/503,404, Office Action mailed on Aug. 31, 2012, 24 pages.
U.S. Appl. No. 11/773,895, Notice of Allowance mailed on Sep. 27, 2013, 11 pages.

* cited by examiner

| | | | | | | | | | |
|---|---|---|---|---|---|---|---|---|---|
| 10010 | ORD-328269 | 8RX013 | San Antonio | Sports Authority | 02-OCT-06 | 53945 | 21 | 596 | Soccer | > 20 Days | Claire Shaw |
| 10011 | ORD-272536 | 8RX013 | Budapest | Sports Authority | 21-AUG-06 | 58714 | 47 | 495 | Soccer | > 20 Days | Amit Singh |
| 10012 | ORD-640482 | 8RX013 | Fort Worth | Sports Authority | 25-SEP-06 | 94772 | 8 | 684 | Soccer | 5 - 20 Days | Claire Shaw |
| 10013 | ORD-412684 | 8RX013 | San Antonio | Sports Authority | 18-SEP-06 | 162434 | 3 | 571 | Soccer | < 5 Days | Ben Tomassetti |
| 10014 | ORD-785351 | 8RX013 | Fort Worth | Sports Authority | 02-OCT-06 | 106862 | 34 | 601 | Soccer | > 20 Days | Ben Tomassetti |
| 10015 | ORD-814748 | 8RX013 | Fort Worth | Sports Authority | 18-SEP-06 | 138331 | 22 | 681 | Soccer | > 20 Days | Amit Singh |
| 10016 | ORD-668669 | 8RX013 | San Antonio | Target | 02-OCT-06 | 348 | 49 | 282 | Soccer | > 20 Days | Amit Singh |
| 10017 | ORD-382518 | 8RX013 | Fort Worth | Target | 28-AUG-06 | 1205 | 3 | 214 | Soccer | < 5 Days | Amit Singh |
| 10018 | ORD-865062 | 8RX013 | Fort Worth | Target | 28-AUG-06 | 3881 | 21 | 601 | Soccer | > 20 Days | Amit Singh |
| 10019 | ORD-430811 | 8RX013 | Budapest | Target | 11-SEP-06 | 24142 | 9 | 361 | Soccer | 5 - 20 Days | Claire Shaw |
| 10020 | ORD-112911 | 8RX013 | Budapest | Target | 04-SEP-06 | 51784 | 26 | 341 | Soccer | > 20 Days | Claire Shaw |
| 10021 | ORD-477089 | 8RX013 | Budapest | Target | 02-OCT-06 | 58701 | 13 | 586 | Soccer | 5 - 20 Days | Claire Shaw |
| 10022 | ORD-429266 | 8RX013 | Fort Worth | Target | 04-SEP-06 | 68150 | 35 | 490 | Soccer | > 20 Days | Ben Tomassetti |
| 10023 | ORD-525772 | 8RX013 | Fort Worth | Target | 04-SEP-06 | 78143 | 37 | 408 | Soccer | > 20 Days | Ben Tomassetti |

| ID | LOCATION | ORDER_SIZE | ORDER_FREQUENCY | ROOT | SEVERITY |
|----|----------|------------|-----------------|------|----------|
| 4 | Memphis | 127 | 167 | root | severe |
| 8 | El Paso | 66 | 66 | root | severe |
| 5 | Detroit | 100 | 98 | root | fatal |
| 2 | Beverly Hills | 2470 | 234 | root | unknown |
| 3 | SoHo | 145 | -156 | root | fatal |
| 6 | St. Louis | 88 | -87 | root | severe |
| 1 | Hollywood | 300 | -250 | root | - |
| 7 | Chicago | 78 | 88 | root | severe |

AUTOMATED TREEMAP CONFIGURATION

CROSS-REFERENCES TO RELATED APPLICATIONS

This application also is related to the following U.S. Patent Applications, each of which is hereby incorporated herein by reference:

U.S. patent application Ser. No. 11/773,895, filed Jul. 5, 2007, entitled "IMPROVEMENTS TO DATA VISUALIZATION TECHNIQUES";

U.S. patent application Ser. No. 11/773,880, filed Jul. 5, 2007, entitled "AGGREGATE LAYOUT FOR DATA VISUALIZATION TECHNIQUES";

U.S. patent application Ser. No. 11/773,916, filed Jul. 5, 2007, entitled "FILTERING FOR DATA VISUALIZATION TECHNIQUES";

U.S. patent application Ser. No. 11/773,908, filed Jul. 5, 2007, entitled "LINKING GRAPHICAL ELEMENTS OF DATA VISUALIZATIONS"; and U.S. patent application Ser. No. 11/745,280 filed May 7, 2007, entitled "RENDERING DATA VISUALIZATION WITH MINIMAL ROUND-OFF ERROR".

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates generally to the visual display of data and, more particularly, to automated treemap generation.

2. Description of the Related Art

In an increasingly competitive world, enterprises are constantly in need of business intelligence that empowers the decision makers in the organization to act on the information, and thus impart extra competitive edge to the organization's products and services. Businesses succeed or fail based on their ability to accurately quantify how many leads become orders, identify their most profitable customers, forecast manufacturing capabilities, manage reliable supply chains, and create sales projections, for example.

However, obtaining information on which decision makers can act presents several practical challenges. One such challenge is the massive amount of data available to the enterprise in today's Information Age. Conversion of data to information which can be readily understood is the obstacle. Additionally, enterprises today have data spread over multiple data sources ranging from legacy systems to relational databases and text files. Even if these problems are surmounted, publishing information in a secure and reliable manner remains another concern for enterprises.

Reporting systems with data visualization functionalities can provide users with the capability to convert diverse data into information that can be easily visualized and deciphered to exploit the information and learn more about the business. Visualization components can emphasize high-level patterns and trends in large and complex datasets. One way of presenting vast amounts of data as comprehendible information is by representing the data in a treemap format. A treemap is a visual representation of a dataset, which is typically hierarchical in nature. A treemap generally includes a collection of two-dimensional cells of rectangular shape, each of which represents one or more data entries of the dataset. The cells of a treemap have characteristics, such as area, color, and texture, that represent the data. The cell characteristics may also be known as graphical attributes. If the dataset is in the form of a table in a database, the rows of the table may be represented by treemap cells and the columns of the table may represent various data dimensions. A data dimension is a set of related data values such as the values in a column of a database table or correlated fields in an XML file that are marked with a common tag. The data dimensions may be mapped to different cell characteristics of the treemap visualization. Thus, a viewer of the treemap can gain insight into data by examining a grouping of cells and cell characteristics.

One barrier to the wide use of treemap displays for data visualization is the complexity involved in configuration of the treemap. Configuration typically requires the skills of data processing, computer programming, and user interface design. Data processing skills are required to examine the data and format the data into a form that can be processed by the visualization component. Computer programming skills are required to configure the visualization component to interpret the data correctly. For example, the current visualization systems require a person with knowledge of complex programming languages to embed code within applet parameters. The code specifies all configuration options including data binding, color binding, graphical styles, and menus. User interface skills are required to configure the user interface of the visualization component for various tasks. These tasks can include interpreting the data values, manipulating the data, and providing access to more detailed application-specific data. It is rare for a single person to be skilled in all of the aforementioned areas. Accordingly, multiple people, each with specialized knowledge in one of these technical areas, are required. When multiple specialists are required for configuring a visualization, the configuration becomes both time-consuming and expensive.

Some visualization systems simplify configuration by eliminating customization capabilities, but this design choice makes these systems generally less useful. Other visualization systems require fewer configuration procedures, but require the dataset to be in a restricted format for specifying hierarchy. These systems specify hierarchies for relational data by extending the data table with additional columns. The additional columns of the data table include the specified hierarchies. However, the use of additional columns in the main data table requires constraints to be placed on the order of columns. For example, parent column names might have to be specified in the first of the additional columns and child names in the second of the additional columns. Moreover, this method requires the use of multiple duplicated strings to indicate group membership, which causes waste of storage space. Additional constraints may be required on the order of rows, where parent rows must be positioned earlier in the table than child rows. Alternatively, if no such constraints are placed on the rows, the data table must be read multiple times to capture the essential information.

Thus, for datasets that have data dimensions that are different from the predefined requirements or which represent hierarchy in a different way than required, treemap visualization is either not a viable option or the efforts required for configuration are greatly exasperated.

BRIEF SUMMARY OF THE INVENTION

In accordance with an embodiment of the invention, systems and methods for automated treemap configuration is provided. A plurality of source data values may be represented as graphical elements in a default treemap visualization, where each data value is associated with a plurality of data dimensions. Furthermore, a first data dimension is selected to map to an area cell characteristic based on the first data dimension having a quality of numeric and a quality of non-negative. Additionally, a second data dimension is selected to map to a color cell characteristic based on the second data dimension having a quality of numeric and a quality of being previously unmapped. The default treemap visualization is generated based on the selected first data dimension and the selected second data dimension.

In accordance with another embodiment, a data visualization method for representing a plurality of hierarchical source data values is provided, where each data value is associated with a plurality of data dimensions. A default hierarchy is determined independently from the source data values by reading a hierarchy table. The hierarchy table includes one or more hierarchical data dimensions and a corresponding depth level for each of the hierarchical data dimensions. A default graphical data visualization is generated based on the default hierarchy.

A further understanding of the nature and the advantages of the inventions disclosed herein may be realized by reference of the remaining portions of the specification and the attached drawings.

BRIEF DESCRIPTION OF THE DRAWINGS

The invention may best be understood by reference to the following description taken in conjunction with the accompanying drawings in which:

FIG. 2 shows a screenshot of an exemplary data table fragment.

FIG. 10 shows an exemplary data table.

DETAILED DESCRIPTION OF THE INVENTION

The systems and methods described herein provide for automatic configuration of a treemap visualization by identifying data dimensions to display using cell characteristics. More specifically, the cells of a treemap typically have characteristics, such as area and color, that represent various data dimensions of the data. For example, the area of the cells can represent one data dimension of the data and the color of the cells can represent another data dimension of the data. In one embodiment, a treemap display page includes a user interface with menus for pivoting among data dimensions and for specifying configuration parameters to override default settings.

One advantage of the various methods described herein is that few constraints are placed on the form of data such that a treemap component with automatic configuration capabilities enables overviews of large, multi-dimensional hierarchical datasets in which the form of the data (e.g. the order of the table columns) may not be known in advance or may not be practical for developers to configure the visualization in advance, for example, in data mining or reporting applications. This enables data from different product teams which has already been stored in the databases to be a source for the treemap visualization, without having to change the format of the existing data. Another advantage is the flexibility in which hierarchies may be specified. Hierarchies are optional and may be specified independently from the form of the data. A third advantage is that no additional configuration is required to generate a user interface for displaying non-hierarchical data dimensions, to change area and color mappings, to change color schemes, hierarchy and sourced datasets.

In the description that follows, embodiments will be described in reference to subsystems on a platform for a software application, such as a database application. However, embodiments are not limited to any particular architecture, environment, application, or implementation. For example, although embodiments will be described in reference to database applications, aspects of the invention may be advantageously applied to any software application. Therefore, the description of the embodiments that follows is for purposes of illustration and not limitation.

Figure 1A:
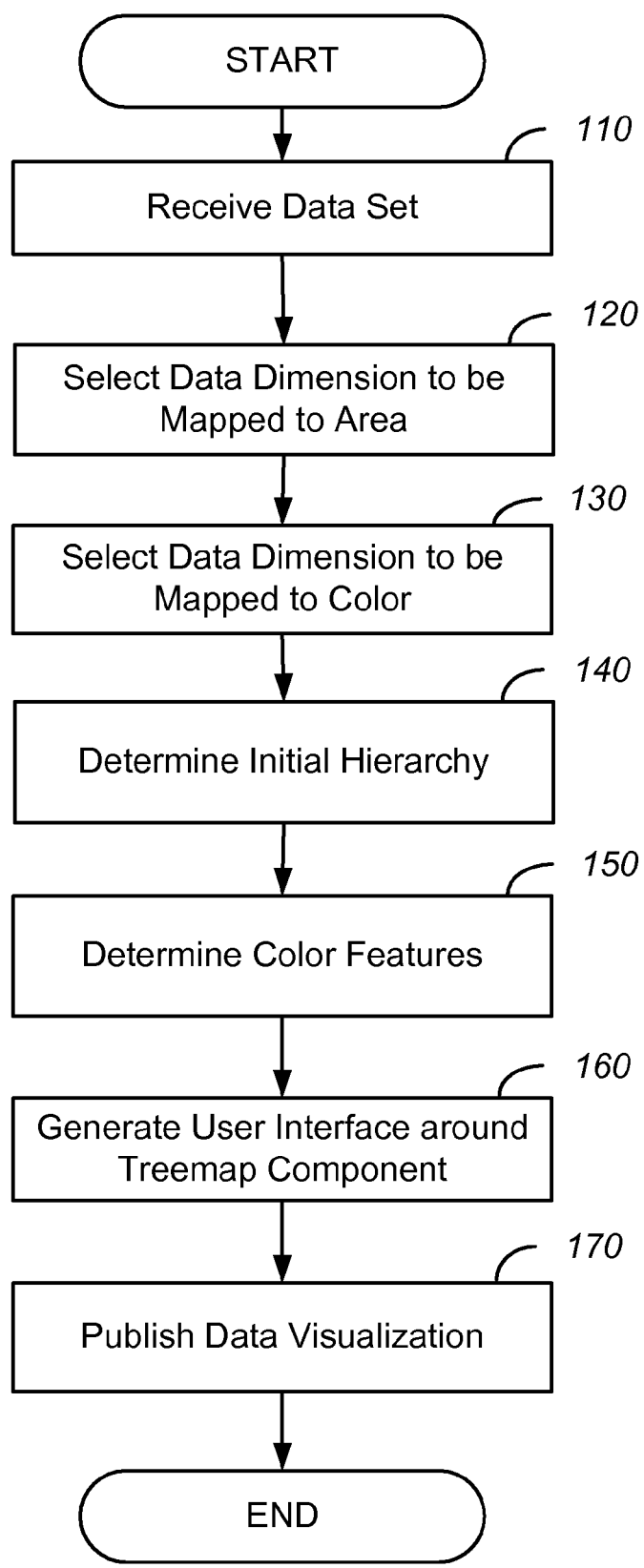
FIG. 1A is an exemplary process flow diagram which illustrates one method of automated treemap configuration.

FIG. 1A is an exemplary process flow diagram which illustrates one method of automated treemap configuration. At step 110, a dataset to be visualized is selected and/or received. In one embodiment, the dataset is received from a data storage system, such as a database. A developer may define one or more queries to be represented by the visual depiction. Moreover, a type of data visualization to be generated is selected. The queries are executed and the requested data is sent to the visualization system. The data received is a range of values that will be represented using graphical elements, such as rectangles, within a graphical layout area. FIG. 2 shows a screenshot of an exemplary data table fragment received. The data table fragment 200 will be used to illustrate the features as taught herein.

Referring back to FIG. 1A, at step 120, a data dimension is selected to be mapped to an area cell characteristic. The treemap default configuration displays arbitrary, and possibly hierarchical, datasets by selecting a data dimension to be mapped to area on the treemap. Selection may be based on the particular qualities of the data dimensions or the data values within the data dimension. In one embodiment in which data dimensions are in the form of columns in a database table, the first column of a data entry may be expected to be an index column and is therefore ignored for purposes of mapping. In another embodiment, a check for negative values is performed in order to prevent a data dimension with negative values from being mapped to area. A treemap is incapable of representing negative areas of rectangles. Accordingly, a data dimension selected for mapping to area should not include negative values.

Further, the data dimensions that are of type "number" are determined. Databases allow table columns to be of many types of numbers. The columns satisfying these requirements are treated as candidate data dimensions for mapping to cell area. In one embodiment, the first non-index, non-negative, numeric column is mapped to cell area.

Moreover, a data dimension that is mapped to area should be stable and less likely to change during refresh. This is to prevent the treemap from shifting between updates. More specifically, the layout algorithm may sort the data and subsequently position in the upper left portion of a layout area, the largest data value for the data dimension that is mapped to area. Should the data values for that data dimension change significantly, the graphical representation of the data entry for both position and area will also change. Significant shifting in the treemap may prevent the user from ascertaining needed information from the treemap. In one embodiment, metadata may be associated with a particular data dimension to indicate that the data dimension satisfies the aforementioned requirements and that the data dimension is a suitable candidate for being mapped to the area cell characteristic.

Referring back to FIG. 2, the data table fragment 200 may relate to retail merchandising. Each row of table 200 represents a purchase order for an item. The purchase order may have associated data dimensions that include Order_Number, Item, Organization, Customer, Due_Date, Dollar_Value, Avg_Days_Late, Quantity, Item_Category, Days_Late, and Planner. The system may determine the data dimensions that are possible candidates for mapping to area and may select the first of these candidates. In one embodiment, the first column that is non-negative, numerical, and is not the index is the Dollar_Value column. As illustrated, few constraints are placed on the form of the database table. Each row is interpreted as a data entry to be displayed as a leaf node in the treemap hierarchy, and numerical and textual data columns may be specified in any order.

Referring back to FIG. 1A, at step 130, a data dimension is selected to be mapped to a color cell characteristic. Selection may be based on the particular qualities of the data within the data dimension. In one embodiment, the candidate data dimensions to be mapped to color exclude the index column and have numerical data types. In one embodiment, the first non-index numeric column that has not been mapped to cell area is mapped to cell color. Data dimensions that have a tendency to fluctuate in value are better candidates to be mapped to the color cell characteristic than to an area characteristic. A data dimension including negative values may remain a candidate for mapping to color. In one embodiment, the color-mapping may be selected independently of the area-mapping.

For example, referring to FIG. 2, the first numerical column that is non-negative, numerical, non-index, and has not been previously mapped, such as to area, is mapped to color in the default configuration. In this example, the column Avg_Days_Late is mapped to color.

Referring back to FIG. 1A, at step 140 an initial hierarchy is determined when multiple hierarchies are possible. The hierarchy governs how the data entries in the represented dataset are grouped in the treemap. Hierarchies may be specified simply and flexibly through the use of a hierarchy table. In one embodiment, hierarchies are optional such that arbitrary datasets may be represented in treemap form. Moreover, the hierarchy table ensures that hierarchy is not encoded with the data table and is thus independent from the data table. The hierarchy table refers to the column names in the main data table. Each column name listed in the hierarchy table is associated with a depth level. The same column name may be listed in multiple rows of the hierarchy table, where each record of the column name is associated with a different depth level to allow flexible hierarchy capabilities. The data table does not need to be modified in order to implement hierarchy, as required by other solutions. If present, the hierarchy table is read during treemap initialization. Heterogeneous hierarchies may be created allowing groupings that mix across different hierarchical data dimensions such as when Product families are grouped by price ranges in a high level of hierarchy, which are, in turn, grouped by geographic areas in a lower level of hierarchy. Prior art systems make it much more difficult to specify heterogeneous hierarchies.

At step 150 color features are determined for the treemap component. In one embodiment, the system sets a default value of either a zero-centered color gradient (e.g. double color gradient) or a single color gradient. A color gradient may represent the magnitude of a data value of the data dimension being mapped to color. Other color features may also be determined. If the data dimension to be mapped to color contains both positive and negative values, a default double gradient could automatically be selected. Whereas, if the data dimension to be mapped to color contains only positive or only negative values, a default single gradient could be selected. In one embodiment, the treemap component may be generated based on the previously described selections and determinations.

At step 160, a user interface may be generated around the treemap component. In one embodiment, in addition to the automatic initialization of the treemap, the system generates menus to allow users to quickly and easily change the default treemap configuration. Additional data dimensions may be displayed using the various treemap cell characteristics. Moreover, hierarchy and non-hierarchical configurations are changeable according to user input. These capabilities are further described below.

At step 170, the data visualization is published. In one embodiment, the treemap is published to an end user in any appropriate form, such as XML. The user interface generated around the treemap may also be published. In one embodiment, queries from different data sources may be combined in a single report, such that the treemap component is added to a report including other data visualizations.

Figure 1B:
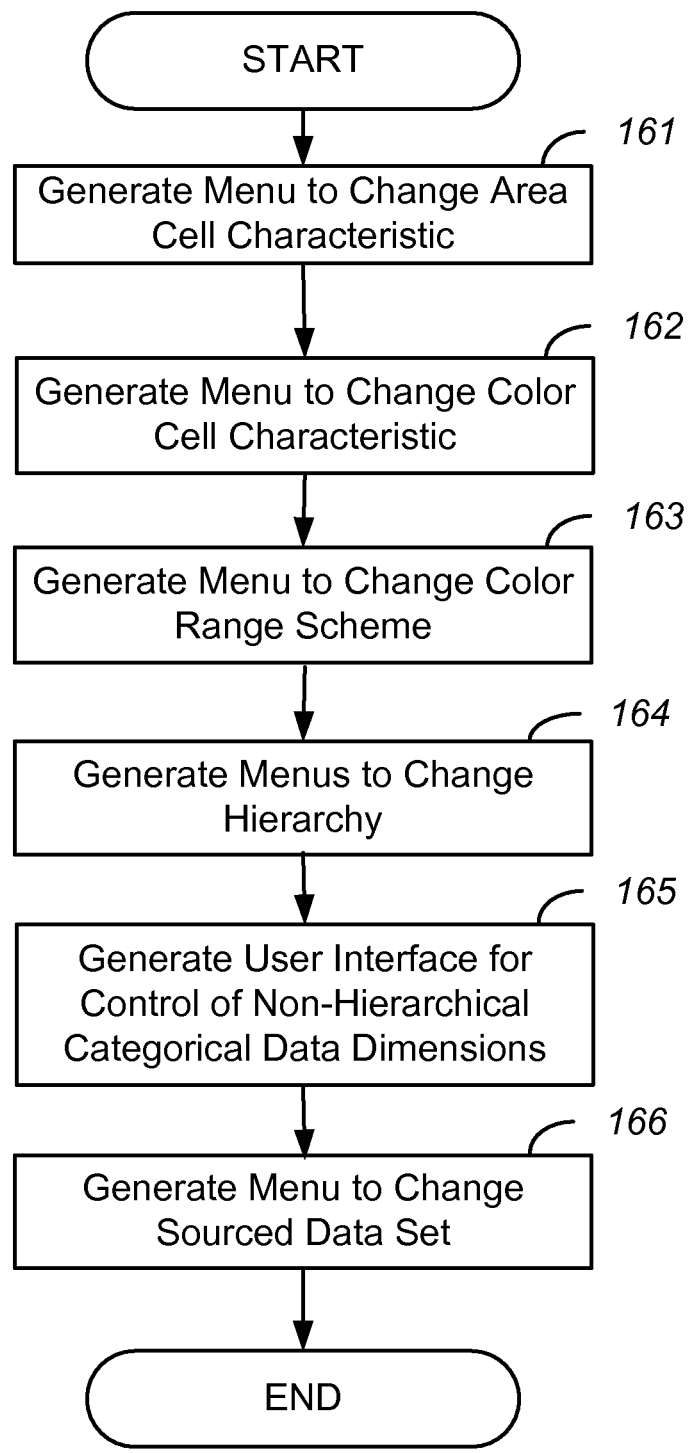
FIG. 1B is an exemplary process flow diagram which illustrates features of a user interface generated around a treemap component.

FIG. 1B is an exemplary process flow diagram which illustrates features of a user interface generated around a treemap component. At step 161, a menu to change the area cell characteristic is generated. As mentioned, the cell area is one cell characteristic that represents the value of the associated data entry for the cell. A menu may be generated and later displayed in a user interface which is placed around the treemap component. The menu allows the user to specify any one of the area-mapping candidate data dimensions (e.g., non-index, non-negative numeric columns) of the dataset to be mapped to area. In one embodiment, the menu displays a list of the area candidates for the user to select. More specifically, the menu is created using the names of the candidate columns, for example, in a drop-down menu.

At step 162, a menu to change a color cell characteristic is generated. The cell color is one cell characteristic that represents the value of the associated data entry for the cell. The cell color is a particular color, shading, or fill-pattern contained within the boundaries of a cell. A menu may be generated to allow the user to specify any one of the color-mapping candidate data dimensions (e.g., non-index numeric columns) of the dataset to be mapped to color. In one embodiment, columns with negative data values may be well represented using cell color. Users may select different data dimensions to be displayed using cell color. The menu may display the names of the candidate data dimensions, for example, in a drop-down menu. Thus, the user is free to select any viable combination of area and color mapping.

At step 163, a menu to change a color range scheme is generated. The default configuration is set to a particular color scheme. For example, the color scheme is set to shades of blue for a single color gradient. The menu is generated to allow the user to specify the color scheme used in the treemap component.

At step 164 a menu to change or pivot the hierarchy is generated. As discussed, the default configuration may select an appropriate hierarchy during initialization of the treemap if a hierarchy table is present. When present, the hierarchy table is read, and the group names and depth levels may be used to automatically create the hierarchy pivot menus. A hierarchy pivot menu is generated to enable the user to modify the default hierarchy to display other possible hierarchies. The hierarchy menu may be displayed in a user interface around the treemap. The hierarchy menu displays the names of hierarchical data dimensions such as the names of the columns listed in the hierarchy table and includes a selector, such as in a drop-down menu, through which a user can select the desired hierarchical data dimensions. When the user selects a particular hierarchical data dimension, the treemap is redrawn so that the cells in the treemap are grouped according to the user-specified hierarchical data dimension. In one embodiment, the use of the hierarchy table, as previously described, enables pivoting to operate independently of the data table. In another embodiment, the hierarchy table may be implemented for other types of data visualizations of hierarchical data.

At step 165 a user interface for controlling non-hierarchical categorical data dimensions is generated. In one embodiment, the user interface and associated graphical elements are rendered within the treemap component of a treemap display page, and a selector for specifying non-hierarchical data dimensions is generated in the user interface of the treemap display page. In one embodiment, the selector is rendered within the treemap cells as a set of check boxes and associated icons. In one embodiment, a non-numeric data column that is not listed in the hierarchy table described above is considered to be a non-hierarchical categorical data dimension. In one embodiment, image icons for the non-hierarchical data dimensions identify categorical collections of data entries. The values in each of these non-hierarchical data dimensions are examined. Rows with identical values are considered to belong to a same category. The category may take a name that is equal to the value. Although not required, configuration parameters could be used to specify alternate icons.

Moreover, any number of unique values in the non-hierarchical columns may be represented using these icons. In one embodiment, the default configuration looks for the first three unique values and generates the user interface with checkboxes, or other user-selectable methods. Once the user selects the particular categorical collection, the icons corresponding to the selected category are displayed in the treemap. Three categories may be depicted with various colored dots within the cells of the treemap, such as red, yellow and green-colored dot icons. The use of icons to represent non-hierarchical data in a default configuration is yet another feature that may be provided in an automatic treemap configuration.

Figure 3:
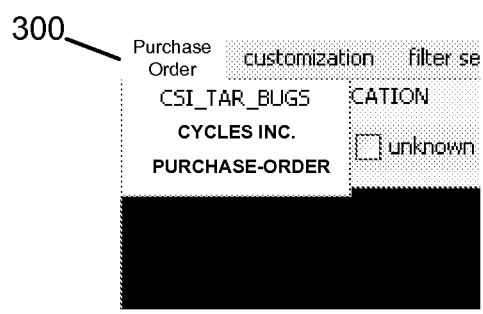
FIG. 3 shows a screenshot of an exemplary menu for selecting a dataset to view as a treemap visualization.

At step 166, a menu for changing the sourced dataset is generated. In one embodiment, a menu is automatically generated to enable a user to switch the data source among multiple datasets. The treemap may be re-generated to display the selected dataset. FIG. 3 shows a screenshot of an exemplary menu for selecting a dataset to view as a treemap visualization. The menu 300 is a user-selectable menu, such as a drop-down menu. For example, CSI_TAR_BUGS, Cycles Inc., and Purchase_Order are all datasets which may be sourced to the treemap component for display. In one embodiment, the datasets displayed in the menu are related.

Figure 4:
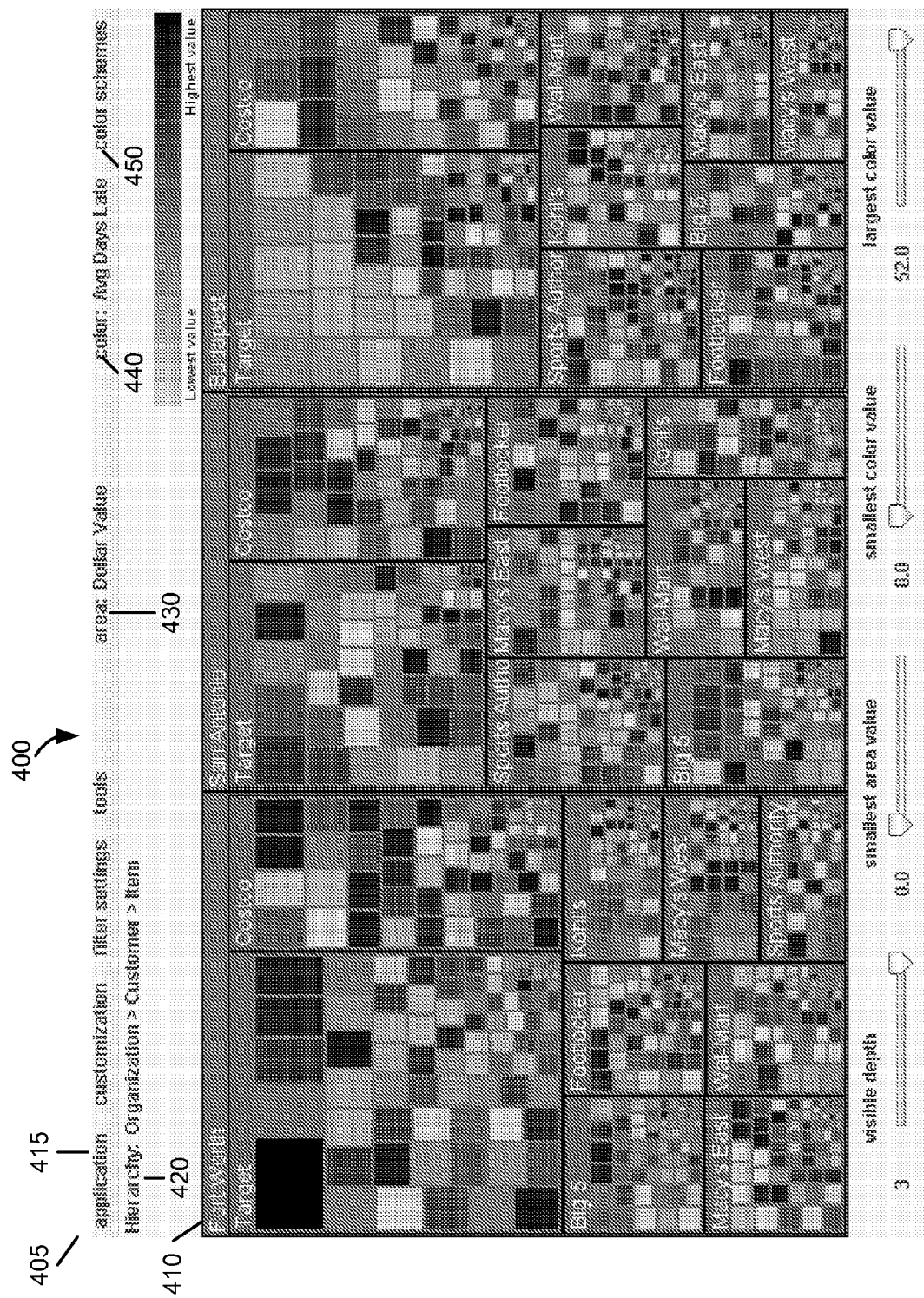
FIG. 4 shows a screenshot of an exemplary treemap component and user interface.

FIG. 4 shows a screenshot of an exemplary treemap component and user interface. In one embodiment, the default treemap display page 400 is a published output of the sourced data table fragment of FIG. 2. A user interface 405 includes an application tab 415, a hierarchy tab 420, an area tab 430, a color tab 440, and a color schemes tab 450. A dataset selection menu is accessible through the application tab 415. As discussed, the dataset selection menu enables a user to change a dataset to be displayed in the treemap 410 from the dataset provided during initialization. The hierarchy menu may be accessed via the hierarchy tab 420. In this example, hierarchy groups the data entries of data table 200 based on the values of the data entries in the organization column, for a top-level hierarchy, in the customer column, for a second-level hierarchy, and in the item column, for a third-level hierarchy. More specifically, the values in each of hierarchical columns (e.g. organization, customer, and item) in the data table 200 are examined. Rows with identical values are considered to belong to a same category. The category may take a name that is equal to the value. For example, in the organization column of table 200, the unique values in the rows are San Antonio, Budapest, and Fort Worth. As shown, in the top-level of hierarchy, the treemap 410 is grouped by these three categories. Thus, the treemap 410 includes heterogeneous hierarchy which enables groupings within groupings of different types of categories.

The hierarchy tab 420 may alternatively be depicted in the user interface 405 in other manners which allow the user to select hierarchies. The area tab 430 indicates the current data dimension that is mapped to the area cell characteristic. In this example, the dollar value column of FIG. 2 is mapped to area in the treemap 410. An area menu may be accessed through the area tab 430 in order to enable a user to change the data dimension (e.g., the column of the data table 200) that is mapped to area. The color tab 440 indicates the current data dimension that is mapped to the color cell characteristic. In this example, the AvgDaysLate column of data table 200 is mapped to color in the treemap 410. A color menu may be accessed through the color tab 440 in order to enable a user to change the data dimension (e.g., the column of the data table 200) that is mapped to color. Additionally, a color schemes menu may be accessed via the color schemes tab 450. The menu enables the user to change the color scheme used in the treemap 410 from the default setting.

Figure 5:
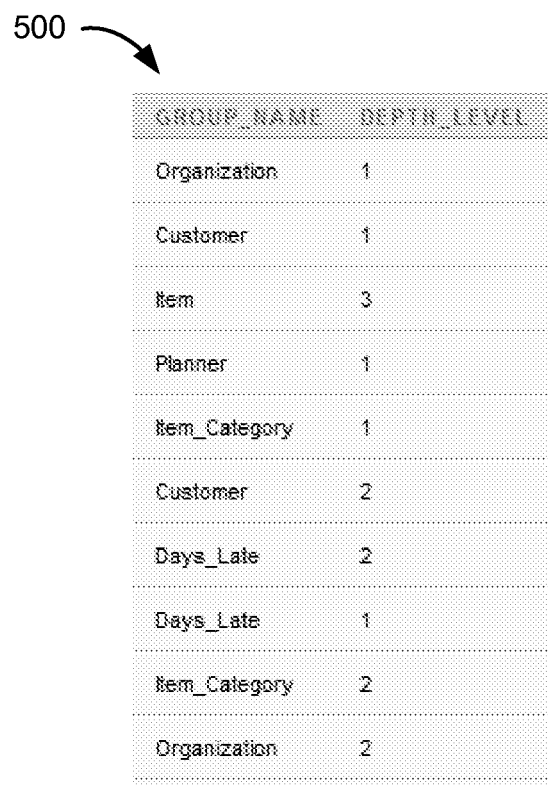
FIG. 5 shows an exemplary hierarchy table.

FIG. 5 shows an exemplary hierarchy table. In one embodiment, the hierarchy table 500 has two columns: Group_Name and Depth_Level. In this example, the group name column is a string data type and the depth level column is an integer data type. Each row in the hierarchy table associates a column from the dataset 200 with a level of hierarchy. The first level of hierarchy includes the column names Organization, Customer, Planner, Item_Category, and Days_Late. The second level of hierarchy includes the column names Customer, Days_Late, Item_Category, and Organization. The third level of hierarchy includes the column name Item. The use of a hierarchy table independent of the data table demonstrates the flexibility in defining hierarchies. Specifically, a column may be associated with multiple depth levels. For example, the Customer column is associated with both a first and second depth level. During initialization, the hierarchy table 500 is read by the system and a valid initial hierarchy is selected by the system. The system may also produce various menus in order to enable the user to change the initial hierarchy depicted in the treemap.

Figure 6:
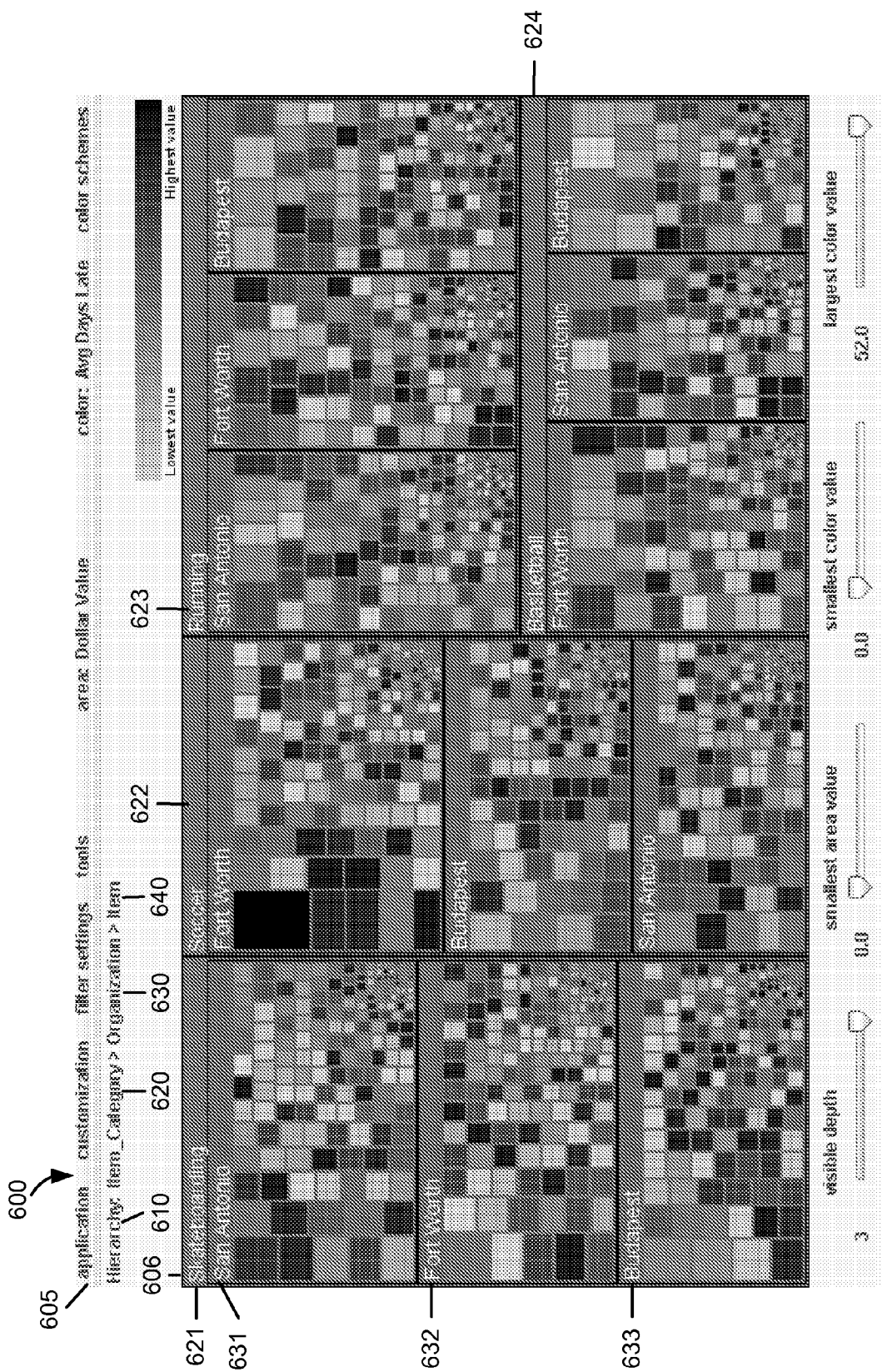
FIG. 6 shows a screenshot of an exemplary user interface and treemap component with multi-level hierarchy.

FIG. 6 shows a screenshot of an exemplary user interface and treemap component with multi-level hierarchy. In this embodiment, the treemap display page 600 is the result of hierarchical modification by a user. For example, the treemap display page 400 of FIG. 4, which is generated based on data table fragment 200, is published to an end user. The user may interact with the user interface 405 to produce the user interface 605 and treemap 606.

Figure 7:
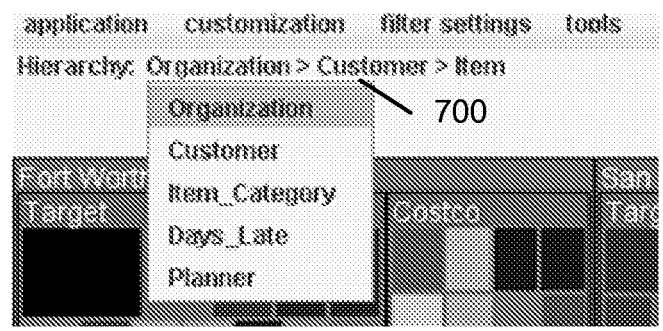
FIG. 7 shows a screenshot of an exemplary menu to change a top level of hierarchy after initialization.
Figure 8:
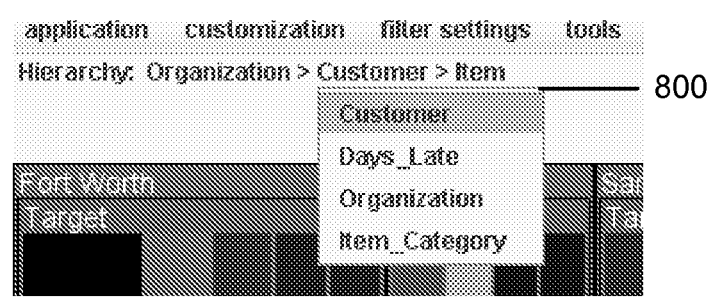
FIG. 8 shows a screenshot of an exemplary menu to change a second level of hierarchy after initialization.

In this example, the first grouping variable has changed from Organization in display page 400 in FIG. 4 to Item_Category 620 in FIG. 6. This change in hierarchy may be accomplished by an end user operating a hierarchy tab 610 to access a hierarchy menu. As previously discussed, hierarchy menus may be generated in order to enable a user to pivot the columns displayed at different hierarchy levels. In one embodiment, multiple hierarchy menus are generated, where each menu corresponds to a single hierarchy level. FIGS. 7 and 8 further illustrate the use of multiple hierarchy menus. For example, FIG. 7 shows a screenshot of an exemplary menu 700 to change a top level of hierarchy after initialization. A user may select any of the listed columns as the top-level hierarchy. The list of top-level hierarchical data dimensions correspond to those listed in the hierarchy table 500 as having a Depth-Level of 1. In the default display page 400, Organization was set at the top-level hierarchy. A user may select, for example, Item_Category from the top-level hierarchy menu 700, producing the top-level hierarchy visualized in treemap 606. Referring back to FIG. 6, the item categories in the treemap include skateboarding 621, soccer 622, running 623, and basketball 624. The records of the data table fragment 200 as well as the complete data table are grouped according to the user-selected first level of hierarchy.

The second level of hierarchy has changed from Customer in FIG. 4 to Organization 630 in FIG. 6. A user may change a hierarchy from the default setting using the hierarchy tab 630 to access a hierarchy menu. For example, FIG. 8 shows a screenshot of an exemplary menu 800 to change a second level of hierarchy after initialization. A user may select any of the listed data dimensions as the second-level hierarchy. The list of second-level data dimensions correspond to those listed in the hierarchy table 500 as having a Depth-Level of 2. Referring back to FIG. 6, the Organizations in the treemap include San Antonio 631, Fort Worth 632, and Budapest 633, among others. The records of the data table fragment 200 as well as the complete data table are grouped according to this second level of hierarchy, in addition to the third level of hierarchy which is based on Item 640, thus producing the treemap component 606.

Figure 9:
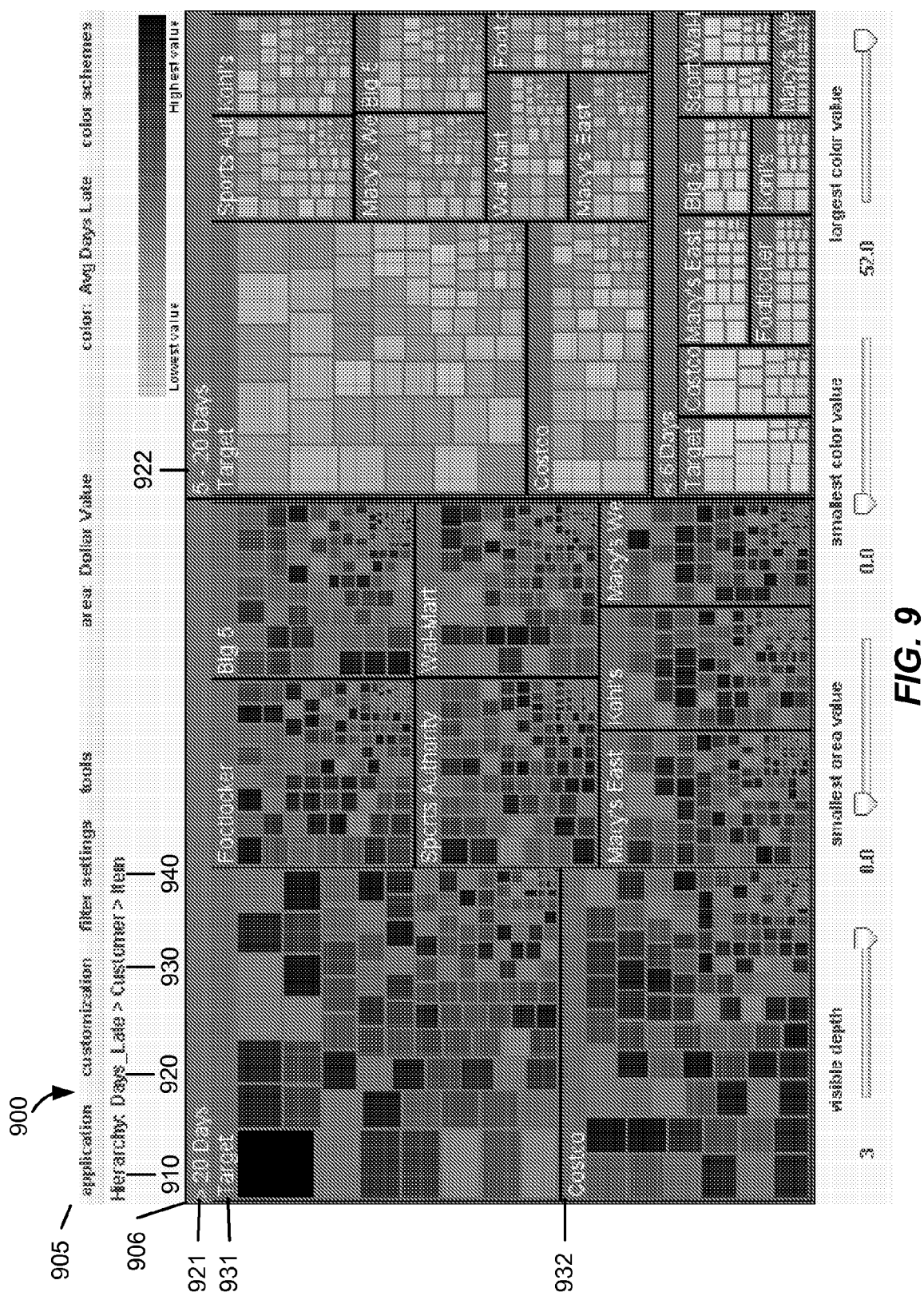
FIG. 9 shows a screenshot of an exemplary user interface and treemap component with multi-level hierarchy.

FIG. 9 shows a screenshot of an exemplary user interface and treemap component with multi-level hierarchy. In one embodiment, a treemap display page 900 is the result of hierarchical modification by a user. For example, the user interface and treemap component of FIG. 4, which is generated based on data table fragment 200, is published to an end user. The user may interact with the user interface to produce the user interface 905 and treemap 906. In this example, hierarchy tab 910 indicates the top-level hierarchy changed to Days_Late 920. Accordingly, the treemap illustrates the top-level grouping is based on the values ">20 Days" 921 and "5-10 Days" 922, which correspond to the unique data values of column Days_Late in data table 200. Moreover, the second-level hierarchy is based on Customer 930. The treemap shows the second-level grouping based on Target 931 and Costco 932, among others. Furthermore, the grouping of the cells are also based on Item 940 as well.

FIG. 10 shows an exemplary data table. In this example, the data table 1000 represents sales orders for Cycles Incorporated ("Cycles Inc."). The table 1000 includes ID, or index, Location, Order_Size, Order_Frequency, Root, and Severity columns.

Figure 11:
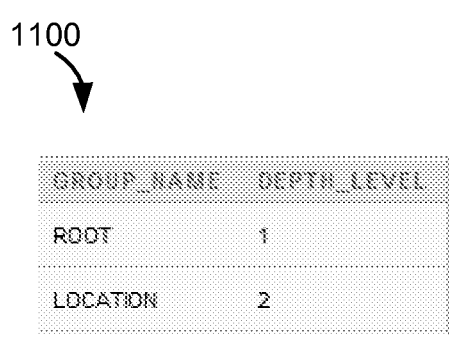
FIG. 11 shows a screenshot of an exemplary hierarchy table.

FIG. 11 shows a screenshot of an exemplary hierarchy table. The hierarchy table 1100 corresponds to the Cycles Inc. data table 1000 of FIG. 10. In this example, the Root and Severity columns of data table 1000 are listed and are associated with corresponding depth levels.

Figure 12:
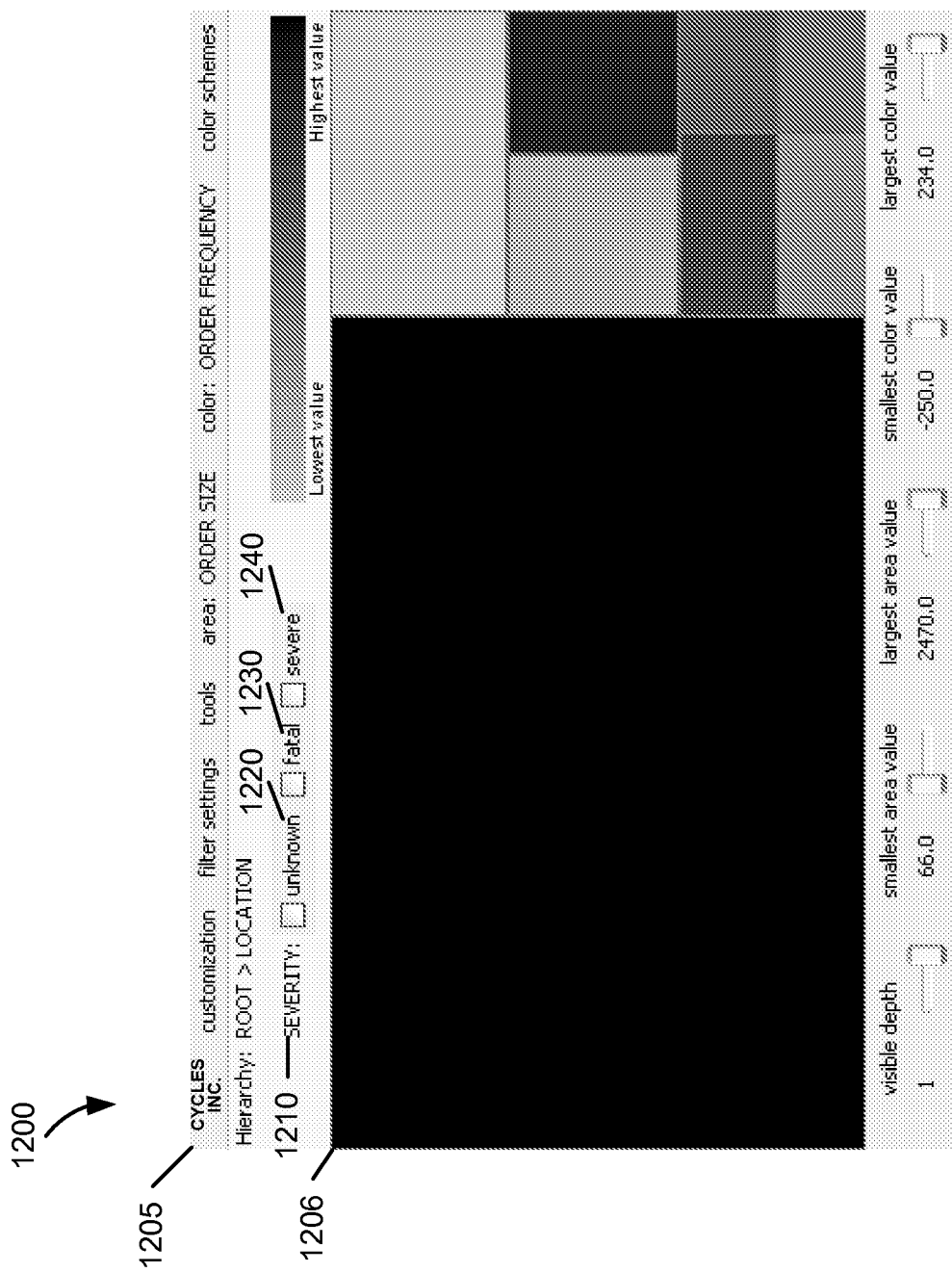
FIG. 12 shows a screenshot of an exemplary treemap component and user interface for controlling non-hierarchical categorical data dimensions.

FIG. 12 shows a screenshot of an exemplary treemap component and user interface for controlling non-hierarchical categorical data dimensions. In this example, the treemap display page 1200 is a visualization of the Cycles Inc. data table 1000. During treemap initialization, image icons may be generated for non-hierarchical data dimensions and rendered within the treemap component. Moreover, a selector for specifying non-hierarchical data dimensions is generated in the user interface 1205 of the treemap display page. As mentioned, a non-numeric data dimension that is not listed in a hierarchy table is considered to be a non-hierarchical categorical data dimension. For example, in FIG. 10, the non-numeric data columns include the Location, Root, and Severity columns. It is determined whether these non-numeric columns are listed in the Hierarchy table 1100. In this example, Location and Root are listed in the Hierarchy Table 1100. Accordingly, the non-hierarchical column for the Cycles Inc. data table 1000 is the Severity column. The values under the non-hierarchical categorical data dimension "Severity" are examined in Cycles Inc. data table 1000. The rows with ID 4, 8, 6, and 7 have values of "severe." These rows are deemed to belong to a same category, named "severe." The rows with ID 5 and 3 have values of "fatal" and are deemed to belong to a same category named "fatal." The row with ID 2 has a value of "unknown" and is deemed to belong to a category named "unknown." In this embodiment, the user interface 1205 of the treemap display page 1200 is extended to include a label 1210 of the non-hierarchical column "Severity." The user interface 1205 also includes a checkbox for the three groupings labeled "unknown" 1220, "fatal" 1230 and "severe" 1240. When a user selects any of checkboxes 1220-1240, an icon is rendered in each of the treemap cells that correspond to the rows with a value of "unknown," "fatal," or "severe" in the "Severity" column of Cycles Inc. data table 1000. The default icons may be colored dots, where the dot color distinguishes among the categorical collections. In another embodiment, icons marked with small letters may be used. For example, an icon marked with the letter "s" could be used to indicate severity values for rows with a data value of "severe." In this example, none of checkboxes 1220-1240 are selected, and thus image icons do not appear in the cells of treemap 1206.

Figure 13:
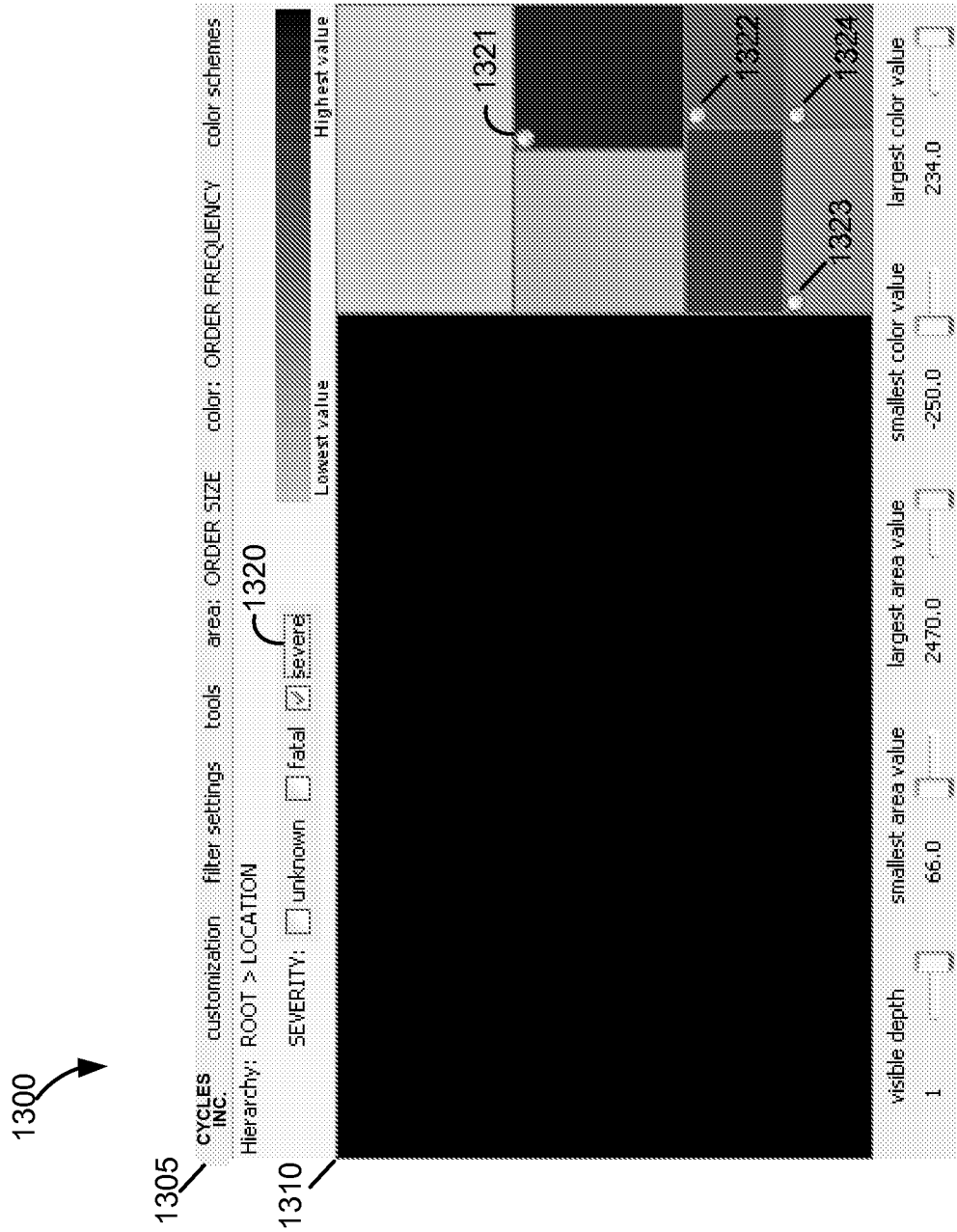
FIG. 13 shows a screenshot of an exemplary treemap component and user interface with image icons showing non-hierarchical categorical data dimensions.

FIG. 13 shows a screenshot of another exemplary treemap component and user interface with image icons showing non-hierarchical categorical data dimensions. The treemap display page 1300 is similar to the display page 1200 of FIG. 12. In this example, the severe checkbox 1320 within the user interface 1305 is selected by the user. Accordingly, the treemap 1310 includes dot icons 1321, 1322, 1323, and 1324 within the cells which correspond to the data table 1000 rows with a value of "severe."

Figure 14:
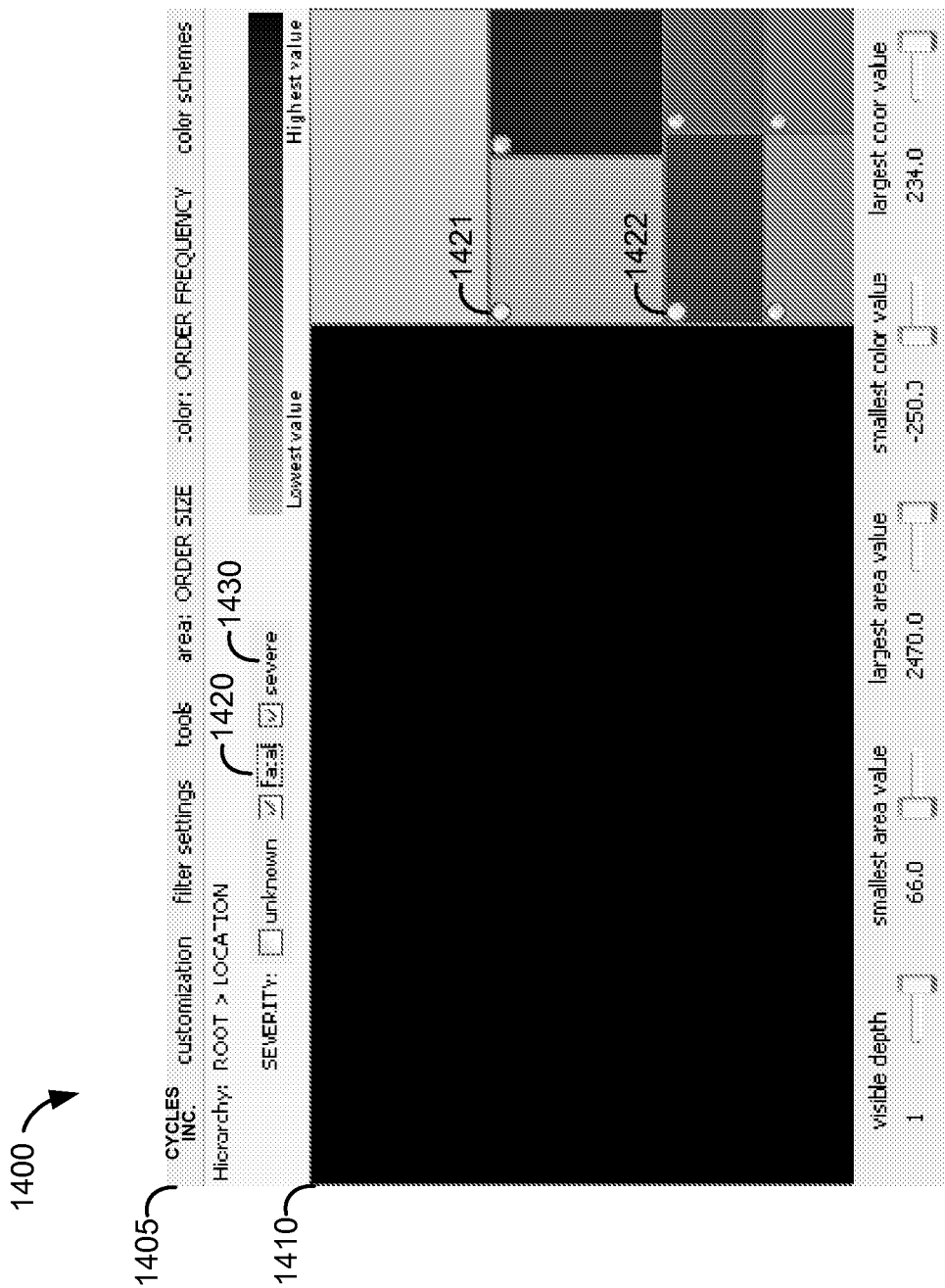
FIG. 14 shows a screenshot of another exemplary treemap component and user interface with image icons.

FIG. 14 shows a screenshot of another exemplary treemap component and user interface with image icons. The treemap display page 1400 is similar to the display page 1300 of FIG. 13. In this example, the "fatal" checkbox 1420 and "severe" checkbox 1430 within the user interface 1405 are selected by the user. Accordingly, the treemap 1410 includes the "severe" dot icons of FIG. 13 in addition to the "fatal" dot icons 1421 and 1422. The icons from one group may be illustrated in a way that enables an end user to distinguish between other groups. For example, the icons from the "severe" group may be colored differently from the icons of the "fatal" group. Other methods of distinguishing among groups may be implemented such as with shape, texture, or symbolic label.

Figure 15:
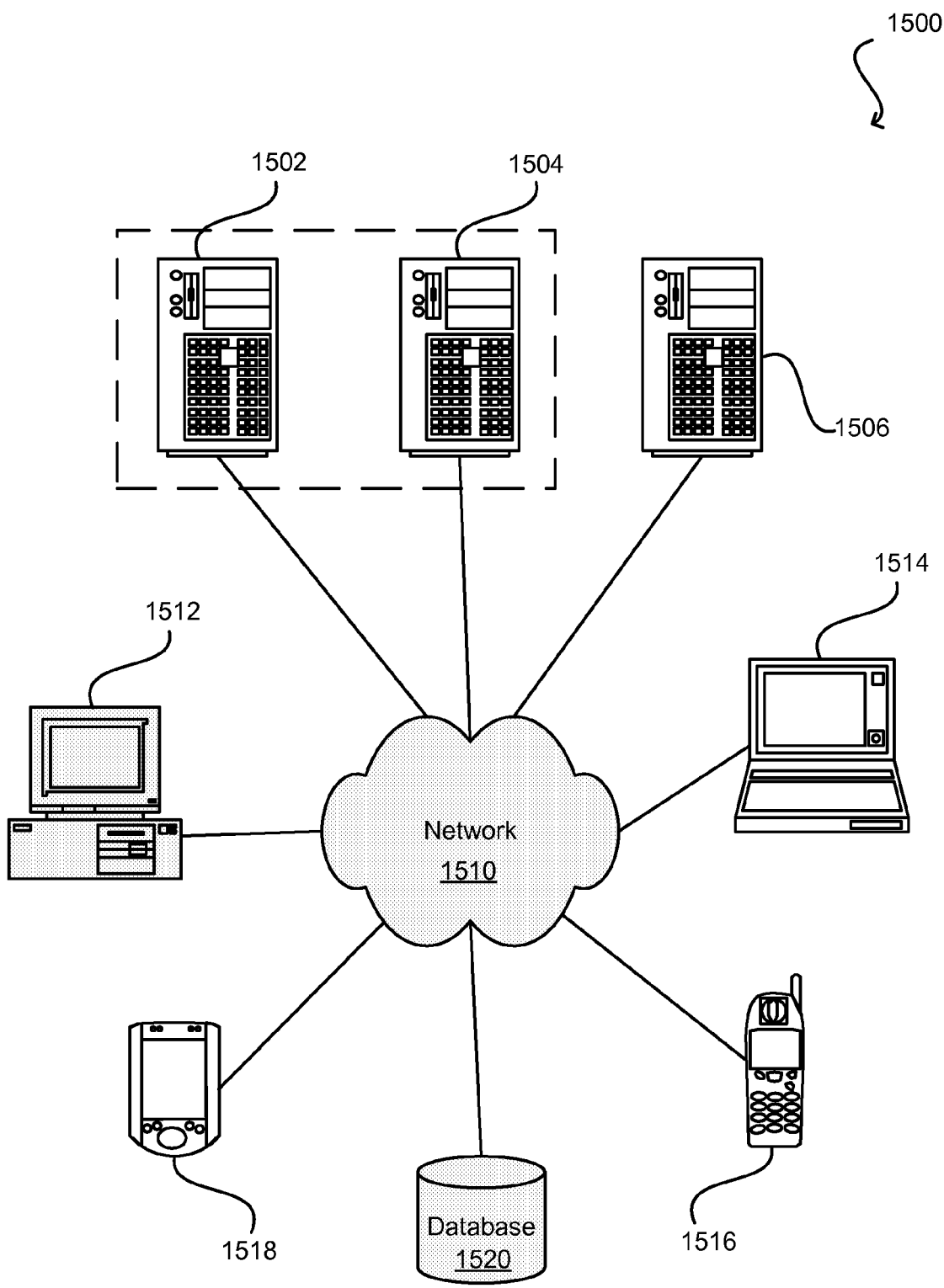
FIG. 15 is a block diagram illustrating components of an exemplary operating environment in which various embodiments of the present invention may be implemented.

FIG. 15 is a block diagram illustrating components of an exemplary operating environment in which various embodiments of the present invention may be implemented. The system 1500 can include one or more user computers, computing devices, or processing devices 1512, 1514, 1516, 1518, which can be used to operate a client, such as a dedicated application, web browser, etc. The user computers 1512, 1514, 1516, 1518 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1512, 1514, 1516, 1518 may also have any of a variety of applications, including one or more development systems, database client and/or server applications, and Web browser applications. Alternatively, the user computers 1512, 1514, 1516, 1518 may be any other electronic device, such as a thin-client computer, Internet-enabled gaming system, and/or personal messaging device, capable of communicating via a network (e.g., the network 1510 described below) and/or displaying and navigating Web pages or other types of electronic documents. Although the exemplary system 1500 is shown with four user computers, any number of user computers may be supported.

In most embodiments, the system 1500 includes some type of network 1510. The network may can be any type of network familiar to those skilled in the art that can support data communications using any of a variety of commercially-available protocols, including without limitation TCP/IP, SNA, IPX, AppleTalk, and the like. Merely by way of example, the network 1510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 1502, 1504, 1506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1506) may be dedicated to running applications, such as a business application, a Web server, application server, etc. Such servers may be used to process requests from user computers 1512, 1514, 1516, 1518. The applications can also include any number of applications for controlling access to resources of the servers 1502, 1504, 1506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1512, 1514, 1516, 1518. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 1512, 1514, 1516, 1518.

The system 1500 may also include one or more databases 1520. The database(s) 1520 may reside in a variety of locations. By way of example, a database 1520 may reside on a storage medium local to (and/or resident in) one or more of the computers 1502, 1504, 1506, 1512, 1514, 1516, 1518. Alternatively, it may be remote from any or all of the computers 1502, 1504, 1506, 1512, 1514, 1516, 1518, and/or in communication (e.g., via the network 1510) with one or more of these. In a particular set of embodiments, the database 1520 may reside in a storage-area network ("SAN") familiar to those skilled in the art. Similarly, any necessary files for performing the functions attributed to the computers 1502, 1504, 1506, 1512, 1514, 1516, 1518 may be stored locally on the respective computer and/or remotely, as appropriate. In one set of embodiments, the database 1520 may be a relational database, such as Oracle 10g, that is adapted to store, update, and retrieve data in response to SQL-formatted commands.

Figure 16:
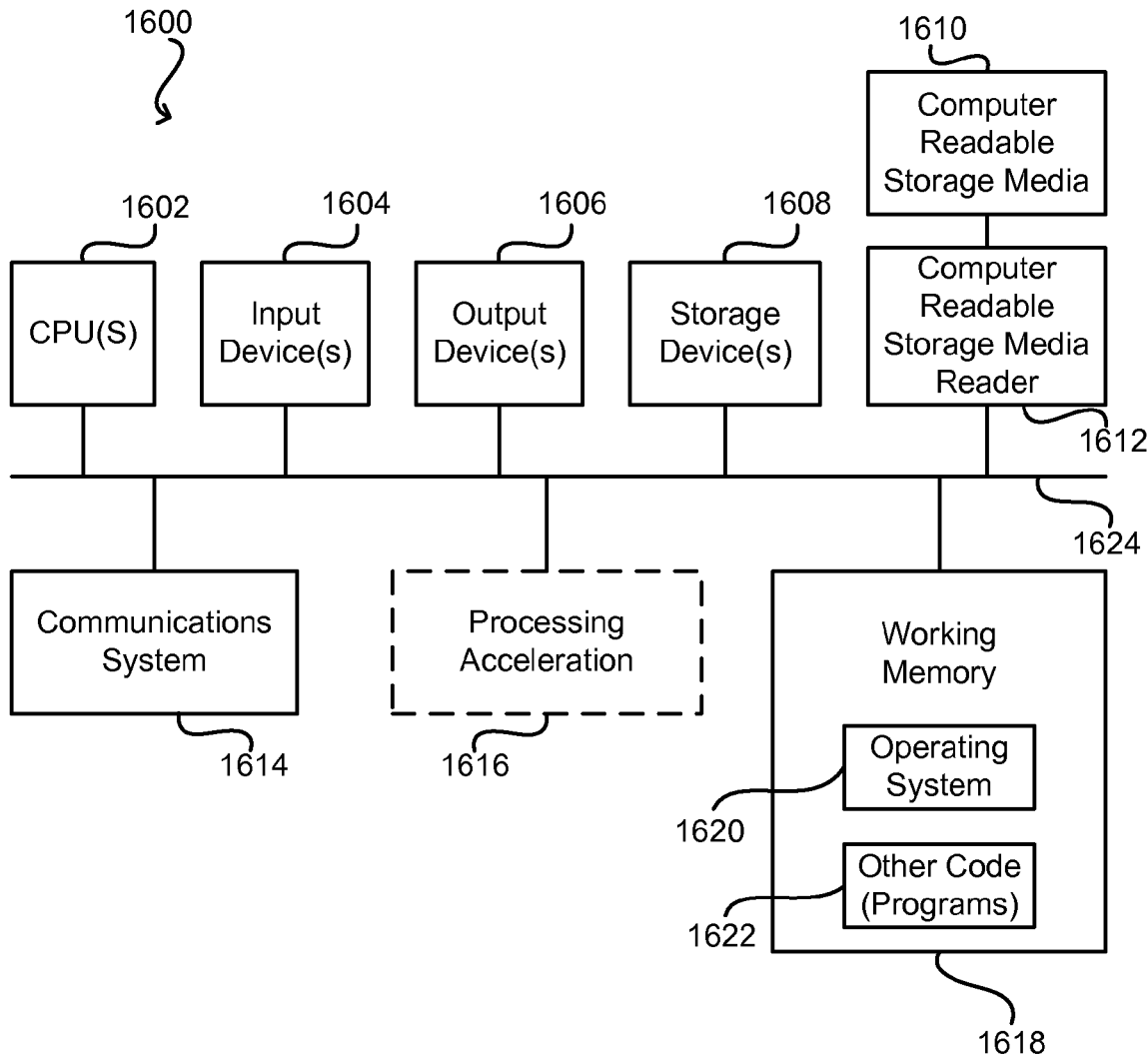
FIG. 16 illustrates an exemplary computer system in which various embodiments of the present invention may be implemented.

FIG. 16 illustrates an exemplary computer system 1600, in which various embodiments of the present invention may be implemented. The system 1600 may be used to implement any of the computer systems described above. The computer system 1600 is shown comprising hardware elements that may be electrically coupled via a bus 1624. The hardware elements may include one or more central processing units (CPUs) 1602, one or more input devices 1604 (e.g., a mouse, a keyboard, etc.), and one or more output devices 1606 (e.g., a display device, a printer, etc.). The computer system 1600 may also include one or more storage devices 1608. By way of example, the storage device(s) 1608 can include devices such as disk drives, optical storage devices, solid-state storage device such as a random access memory ("RAM") and/or a read-only memory ("ROM"), which can be programmable, flash-updateable and/or the like.

The computer system 1600 may additionally include a computer-readable storage media reader 1612, a communications system 1614 (e.g., a modem, a network card (wireless or wired), an infra-red communication device, etc.), and working memory 1618, which may include RAM and ROM devices as described above. In some embodiments, the computer system 1600 may also include a processing acceleration unit 1616, which can include a digital signal processor DSP, a special-purpose processor, and/or the like.

The computer-readable storage media reader 1612 can further be connected to a computer-readable storage medium 1610, together (and, optionally, in combination with storage device(s) 1608) comprehensively representing remote, local, fixed, and/or removable storage devices plus storage media for temporarily and/or more permanently containing computer-readable information. The communications system 1614 may permit data to be exchanged with the network and/or any other computer described above with respect to the system 1600.

The computer system 1600 may also comprise software elements, shown as being currently located within a working memory 1618, including an operating system 1620 and/or other code 1622, such as an application program (which may be a client application, Web browser, mid-tier application, RDBMS, etc.). It should be appreciated that alternate embodiments of a computer system 1600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. For example, the teachings herein may be extended to cover default configuration for other data visualizations. The scope of the invention should, therefore, be determined not with reference to the above description, but instead should be determined with reference to the pending claims along with their full scope or equivalents.

What is claimed is:

1. A method for representing a plurality of source data values as graphical elements in a treemap visualization, comprising:

determining, with one or more processors associated with one or more computer systems, a plurality of candidate data dimensions from a plurality of data dimensions for one or more depth levels of the treemap visualization, wherein the treemap visualization comprises a predefined number of hierarchical depth levels, each hierarchical depth level of the predefined number of hierarchical depth levels representing a data dimension associated with one or more data values, and wherein the plurality of candidate data dimensions are only a portion of the plurality of data dimensions;

generating a hierarchy of the treemap visualization by selecting, with one or more processors associated with one or more computer systems, a first candidate data dimension from the determined plurality of candidate data dimensions for the one or more depth levels;

determining, with one or more processors associated with one or more computer systems, a plurality of area-mapping candidate data dimensions for the treemap visualization from the plurality of data dimensions;

selecting, prior to generating the treemap visualization, a first area-mapping candidate data dimension of the plurality of area-mapping candidate data dimensions to map to an area cell characteristic of the treemap visualization based at least in part on identifying a data value associated with the first area-mapping candidate data dimension having a quality of numeric and a quality of non-negative, the area cell characteristic representing a data value of an area cell in the treemap visualization corresponding to the data value associated with the first area-mapping candidate data dimension;

determining, with one or more processors associated with one or more computer systems, a plurality of color-mapping candidate data dimensions for the treemap visualization from the plurality of data dimensions;

selecting, prior to generating the treemap visualization, a first color-mapping candidate data dimension of the plurality of color-mapping candidate data dimensions to map to a color cell characteristic of the treemap visualization based at least in part on identifying a data value associated with the first color-mapping candidate data dimension having a quality of numeric and a quality of previously unmapped as an area-mapping candidate, the color cell characteristic representing a data value of a color cell in the treemap visualization corresponding to the data value associated with the first color-mapping candidate data dimension;

generating, with one or more processors associated with one or more computer systems, the treemap visualization based on the selected first candidate data dimensions, the selected first area-mapping candidate data dimension, and the selected first color-mapping candidate data dimension;

receiving, at one or more computer systems, information provided by a user of the treemap visualization selecting a second candidate data dimension from the plurality of candidate data dimensions for a particular depth level of the treemap visualization; and modifying the treemap visualization based on the selected second candidate data dimension.

2. The method of claim 1, wherein selecting the first area-mapping candidate data dimension is based on metadata indicating the one or more of the plurality of data dimensions are candidates to be mapped to the area cell characteristic.

3. The method of claim 1, wherein selecting the first candidate data dimension for the one or more depth levels comprises reading a hierarchy table comprising one or more data dimensions of the plurality of data dimensions and a corresponding depth level for each of the one or more data dimensions.

4. The method of claim 3, wherein, in the hierarchy table, a data dimension of the one or more data dimensions corresponds to the one or more depth levels of the treemap visualization.

5. The method of claim 3, further comprising:
generating a hierarchy pivot interface associated with the treemap visualization, the hierarchy pivot interface including selectable fields configured to enable a user of the hierarchy pivot interface to modify the selected first candidate data dimension for the one or more depth levels of the treemap visualization, wherein each field is a data dimension of the one or more data dimensions comprising the hierarchy table.

6. The method of claim 5, further comprising:
generating the hierarchy pivot interface for each depth level.

7. The method of claim 1, further comprising:
receiving a color gradient to represent a magnitude of the source data values corresponding to the selected first color-mapping candidate data dimension.

8. The method of claim 7, further comprising:
generating a graphical user interface including selectable fields configured to enable a user of the graphical user interface to modify the color gradient.

9. The method of claim 1, further comprising:
generating a graphical user interface including selectable fields configured to enable a user of the graphical user interface to modify the first data dimension mapping to the area cell characteristic, wherein each field is an area-mapping candidate data dimension of the plurality of area-mapping candidate data dimensions to map to the area cell characteristic.

10. The method of claim 1, further comprising:
generating a graphical user interface including selectable fields configured to enable a user of the graphical user interface to modify the first color-mapping candidate data dimension mapping to the color cell characteristic, wherein each field is a color-mapping candidate data dimension of the plurality of color-mapping candidate data dimensions to map to the color cell characteristic.

11. The method of claim 1, further comprising:
generating a graphical user interface including a selectable field representing a categorical collection of data of one or more non-hierarchical data dimensions of the plurality of data dimensions.

12. The method of claim 11, wherein the graphical user interface enables a user to modify the treemap visualization to include a graphical element in each cell of the treemap visualization that corresponds to the categorical collection.

13. A data visualization method for representing a plurality of hierarchical source data values comprising:
determining, with one or more processors associated with one or more computer systems, a plurality of candidate data dimensions from a plurality of data dimensions for one or more depth levels of a treemap visualization, wherein the treemap visualization comprises a predefined number of hierarchical depth levels, each hierarchical depth level of the predefined number of hierarchical depth levels representing a data dimension associated with one or more data values;
determining, a hierarchy for the source data values independent from the source data values based on reading a hierarchy table stored independently from the source data values,
wherein the hierarchy table comprises a plurality of candidate data dimensions of the plurality of data dimensions corresponding to the one or more depth levels, and
wherein the plurality of candidate data dimensions are only a portion of the plurality of data dimensions;
selecting, prior to generating the treemap visualization, a first candidate data dimension of the plurality of candidate data dimensions to map to a cell characteristic of the treemap visualization based at least in part on identifying a data value associated with the first candidate data dimension having a quality of numeric and a quality of non-negative, the cell characteristic representing a data value of a cell in the treemap visualization corresponding to the data value associated with the first candidate data dimension; and
generating the treemap visualization based at least in part on the hierarchy and the selected candidate data dimension.

14. A non-transitory computer-readable medium storing a computer program product for representing a plurality of source data values as graphical elements in a treemap visualization, comprising:
code for determining a plurality of candidate data dimensions from a plurality of data dimensions for one or more depth levels of the treemap visualization, wherein the treemap visualization comprises a predefined number of hierarchical depth levels, each hierarchical depth level of the predefined number of hierarchical depth levels representing a data dimension associated with one or more data values, and wherein the plurality of candidate data dimensions are only a portion of the plurality of data dimensions;
code for generating a hierarchy of the treemap visualization by selecting a first candidate data dimension from the determined plurality of candidate data dimensions for the one or more depth levels;
code for determining a plurality of area-mapping candidate data dimensions for the treemap visualization from the plurality of data dimensions;
code for selecting, prior to generating the treemap visualization, a first area-mapping candidate data dimension of the plurality of area-mapping candidate data dimensions to map to an area cell characteristic of the treemap visualization based at least in part on identifying a data value associated with the first area-mapping candidate data dimension having a quality of numeric and a quality of non-negative, the area cell characteristic representing a data value of an area cell in the treemap visualization corresponding to the data value associated with the first area-mapping candidate data dimension;
code for determining a plurality of color-mapping candidate data dimensions for the treemap visualization from the plurality of data dimensions;
code for selecting, prior to generating the treemap visualization, a first color-mapping candidate data dimension of the plurality of color-mapping candidate data dimensions to map to a color cell characteristic of the treemap visualization based at least in part on identifying a data value associated with the first color-mapping candidate data dimension having a quality of numeric and a quality of previously unmapped as an area-mapping candidate, the color cell characteristic representing a data value of a color cell in the treemap visualization corresponding to the data value associated with the first color-mapping candidate data dimension;
code for generating the treemap visualization based on the selected first candidate dimensions, the selected first area-mapping candidate data dimension, and the selected first color-mapping candidate data dimension;
code for receiving information provided by a user of the treemap visualization selecting a second candidate data dimension from the plurality of candidate data dimensions for a particular depth level of the treemap visualization; and code for modifying the treemap visualization based on the selected second candidate data dimension.

15. The non-transitory computer-readable medium storing a computer program product according to claim 14, wherein selecting the first area-mapping candidate data dimension is based on metadata indicating the one or more of the plurality of data dimensions are candidates to be mapped to the area cell characteristic.

16. The non-transitory computer-readable medium storing a computer program product according to claim 14, wherein selecting the first candidate data dimension for the one or more depth levels comprises reading a hierarchy table comprising one or more data dimensions of the plurality of data dimensions and a corresponding depth level for each of the one or more data dimensions.

17. The non-transitory computer-readable medium storing a computer program product according to claim 14, wherein, in the hierarchy table, a data dimension of the one or more data dimensions corresponds to the one or more depth levels of the treemap visualization.

18. A system for representing a plurality of source data values as graphical elements in a treemap visualization, the system comprising:

a processor; and a memory coupled to the processor, the memory configured to store a plurality of code modules which when executed by the processor cause the processor to:

determine a plurality of candidate data dimensions from a plurality of data dimensions for one or more depth levels of the treemap visualization, wherein the treemap visualization comprises a predefined number of hierarchical depth levels, each hierarchical depth level of the predefined number of hierarchical depth levels representing a data dimension associated with one or more data values, and wherein the plurality of candidate data dimensions are only a portion of the plurality of data dimensions;

generate a hierarchy of the treemap visualization by selecting a first candidate data dimension from the determined plurality of candidate data dimensions for the one or more depth levels;

determine a plurality of area-mapping candidate data dimensions for the treemap visualization from the plurality of data dimensions;

select, prior to generating the treemap visualization, a first area-mapping candidate data dimension of the plurality of area-mapping candidate data dimensions to map to an area cell characteristic of the treemap visualization based at least in part on identifying a data value associated with the first area-mapping candidate data dimension having a quality of numeric and a quality of non-negative, the area cell characteristic representing a data value of an area cell in the treemap visualization corresponding to the data value associated with the first area-mapping candidate data dimension;

determine a plurality of color-mapping candidate data dimensions for the treemap visualization from the plurality of data dimensions;

select, prior to generating the treemap visualization, a first color-mapping candidate data dimension of the plurality of color-mapping candidate data dimensions to map to a color cell characteristic of the treemap visualization based at least in part on identifying a data value associated with the first color-mapping candidate data dimension having a quality of numeric and a quality of previously unmapped as an area-mapping candidate, the color cell characteristic representing a data value of a color cell in the treemap visualization corresponding to the data value associated with the first color-mapping candidate data dimension;

generate the treemap visualization based on the selected first candidate data dimensions, the selected first area-mapping candidate data dimension, and the selected first color-mapping candidate data dimension;

receive information provided by a user of the treemap visualization selecting a second candidate data dimension from the plurality of candidate data dimensions for a particular depth level of the default treemap visualization; and modify the treemap visualization based on the selected second candidate data dimension.

19. The system of claim 18, wherein the processor is caused to select the first area-mapping candidate data dimension based on metadata indicating the one or more of the plurality of data dimensions are candidates to be mapped to the area cell characteristic.

20. The system of claim 18, wherein the processor is caused to:

select the first candidate data dimension for the one or more depth levels by reading a hierarchy table comprising one or more data dimensions of the plurality of data dimensions and a corresponding depth level for each of the one or more data dimensions.

* * * * *

UNITED STATES PATENT AND TRADEMARK OFFICE
CERTIFICATE OF CORRECTION

| | | |
|---|---|---|
| PATENT NO. | : 8,866,815 B2 | Page 1 of 1 |
| APPLICATION NO. | : 11/752915 | |
| DATED | : October 21, 2014 | |
| INVENTOR(S) | : Jonathan Helfman et al. | |

It is certified that error appears in the above-identified patent and that said Letters Patent is hereby corrected as shown below:

In the claims

Column 18, Claim 18, Lines 33-34:

Replace "... for a particular depth level of the default treemap visualization; and..." with -- for a particular depth level of the treemap visualization; and... --

Signed and Sealed this
Fifth Day of April, 2016

Michelle K. Lee
*Director of the United States Patent and Trademark Office*